J. H. PITTS.
BAKING PAN.
No. 191,548.  Patented June 5, 1877.
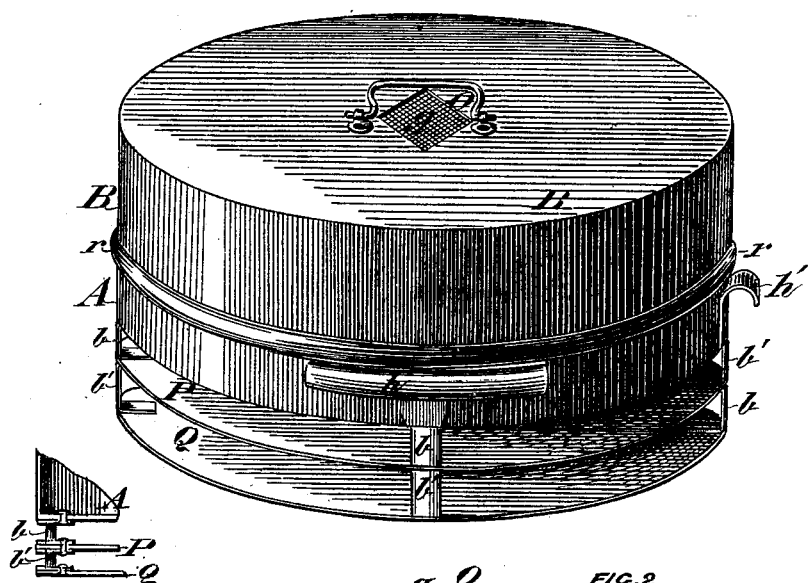
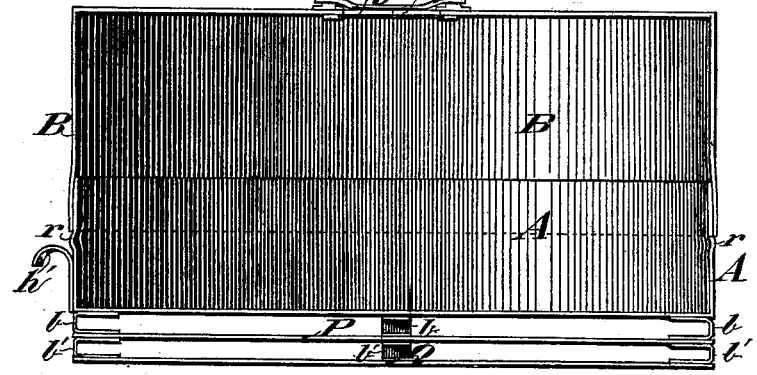
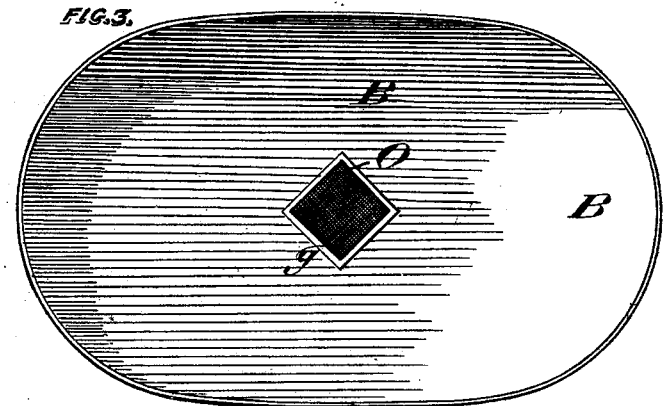
WITNESSES:
Jacob Salomon
Henry A. Washo
INVENTOR
John H. Pitts

UNITED STATES PATENT OFFICE.

JOHN H. PITTS, OF SAN FRANCISCO, CALIFORNIA.

IMPROVEMENT IN BAKING-PANS.

Specification forming part of Letters Patent No. 191,548, dated June 5, 1877; application filed January 18, 1877.

*To all whom it may concern:*

Be it known that I, JOHN H. PITTS, a resident of the city and county of San Francisco, State of California, have invented certain Improvements in Baking-Pans, of which the following is a specification:

My invention consists, essentially, of a pan with cover, wherein articles requiring to be cooked or heated may be inserted, so as to be subjected to the heat of an ordinary oven, said pan being made to rest on supports provided with a radiating plate or shield, and said cover being provided with an opening at the top covered with metallic gauze; the objects of my invention being, first, to cause the heat from the bottom of the oven to be radiated by this plate around the baking-pan, so as the better to equalize this heat thereon, and prevent it immediately attacking the bottom of the baking-pan, thus avoiding the burning of any fatty gravy or article therein being cooked; secondly, by the opening in the cover, to allow of the escape of any gas, either from fatty matter or any slight taint arising from the article being baked, while, at the same time, the steam generated from such article will be almost wholly retained within the pan, so as to perfect the baking process.

Figure 1 is a perspective view of the baking-pan fitted with the improvements embodying my invention. Fig. 2 is a longitudinal vertical section of the same. Fig. 3 is a plan of the cover reversed.

With reference to the drawing, A A represent the lower portion of the baking-pan in which the article to be baked is placed, and B B the cover fitting to the same. The pan A A is provided on its sides with a flared rim, $r$, for the due adjustment in place of the cover, and to the bottom four small angle-iron pieces or flat-headed bolts, $b$ $b'$, secure a plate, P, corresponding to, of the same dimensions and parallel to, the baking-pan bottom, the attachment of this plate by these bolts, &c., allowing of a free circulation of air between it and the baking-pan. This plate P, which I term a "radiator," is attached to a similar plate, Q, in a similar manner, by four bolts, &c., placed equidistant from one another, the whole being so arranged and constructed that this plate Q may rest on the bottom of the oven as a stand, having the radiator P a distance above it equal to that which the baking-pan bottom is above this plate P. On front, rear, and on one end of this pan broad handles $h$, made of curved metal strips, are attached, so as the better to fit this apparatus for being handled in all positions when heated, or for being withdrawn from an oven. The cover B B is made of any suitable material, and is shaped like any ordinary deep-pan cover for the vessel A A, but is provided at the top, in the center, with a small aperture, O, covered by a fine metallic-gauze cover, $g$.

By this general arrangement, when an article to be baked is inserted in this pan A A, and covered by the cover B B, and placed in a closed heated oven, it will, in addition to allowing the free circulation of air around it, as shown in other such baking-pans, cause such heat to be radiated from the plate or shield P, so as to prevent too sudden a heating or baking of the article therein contained, and the cover will retain almost entirely the steam generated from such article being baked, so as to thoroughly permeate the same, but will readily allow at the same time of the escape of any taint or gas from burning fat, &c., from this gauze-covered opening O $g$, and thus, while baking the article, free it from any bad taste.

I claim as my invention—

1. The combination of the baking-pan described, provided with radiator P and handles $h$ $h$ $h'$, with the cover B B, provided with metallic-gauze-covered aperture O $g$, substantially as and for the purposes herein set forth.

2. The baking-pan A A, provided with radiating-plate P, arranged in the manner described, substantially as and for the purposes specified.

3. In a baking-pan, as described, the cover B B, provided with aperture O, covered with metallic gauze, substantially as and for the purposes herein set forth and specified.

JOHN H. PITTS.

Witnesses:
J. LASSALETTE,
D. K. SWIM.